United States Patent [19]
Dietrick

[11] 3,718,408
[45] Feb. 27, 1973

[54] PUMP AND VALVE UNIT FOR ELECTRICAL DISCHARGE MACHINING

[76] Inventor: Gerald P. Dietrick, 523 Ridgeview Drive, Florence, Ky. 41042

[22] Filed: March 20, 1972

[21] Appl. No.: 236,091

Related U.S. Application Data

[62] Division of Ser. No. 118,316, Feb. 24, 1971.

[52] U.S. Cl. ................ 417/178, 417/185, 417/190
[51] Int. Cl. .......................................... F04f 5/48
[58] Field of Search ...... 417/178, 182, 185, 190, 151; 216/69 D

[56] References Cited

UNITED STATES PATENTS

| | | | |
|---|---|---|---|
| 49,603 | 8/1865 | Chappell | 417/178 X |
| 1,950,172 | 3/1934 | Gavaza | 417/185 X |

*Primary Examiner*—Carlton R. Croyle
*Assistant Examiner*—Richard E. Gluck
*Attorney*—James W. Pearce et al.

[57] ABSTRACT

Electrical discharge machining equipment including a worktable reservoir tank, a fluid storage and settling tank and a source of clean fluid under pressure. Clean fluid under pressure is directed to a gap between an electrode and a workpiece in the reservoir tank during machining. Fluid is pumped between the tanks by a jet pump. Clean fluid under pressure powers the jet pump. A side arm of the jet pump can be connected to each of the tanks alternately to draw fluid therefrom. The discharge of the jet pump is connected to the other tank to discharge into the other tank.

2 Claims, 10 Drawing Figures

PATENTED FEB 27 1973

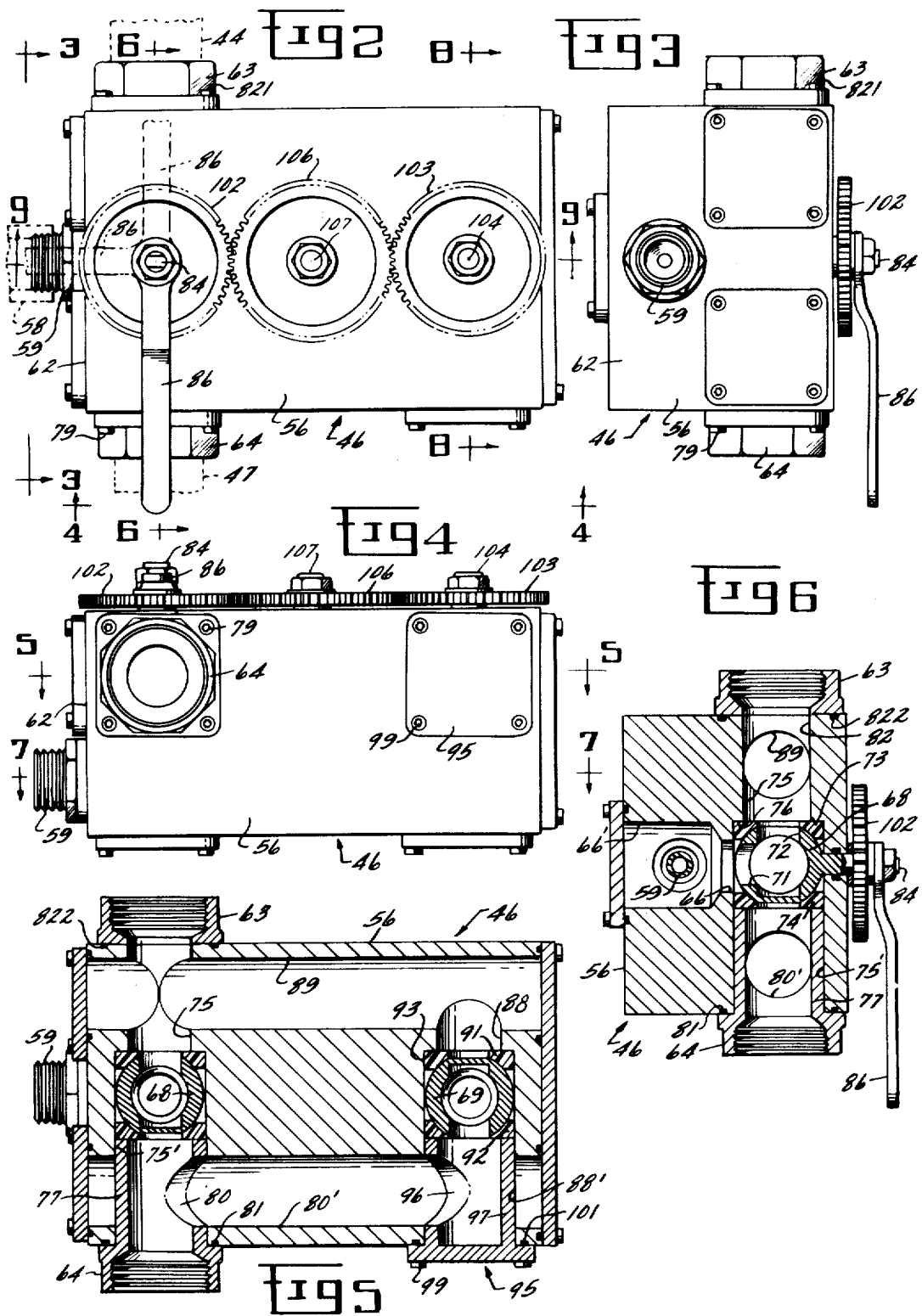

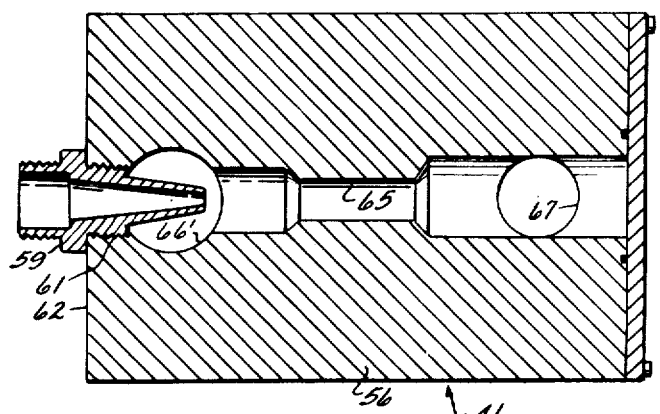
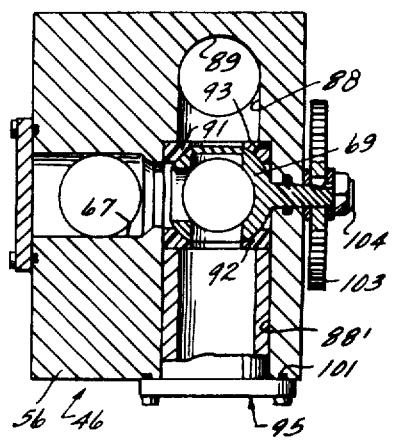
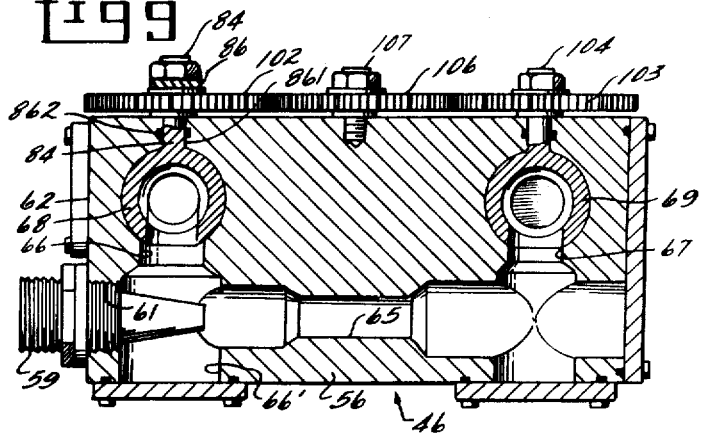
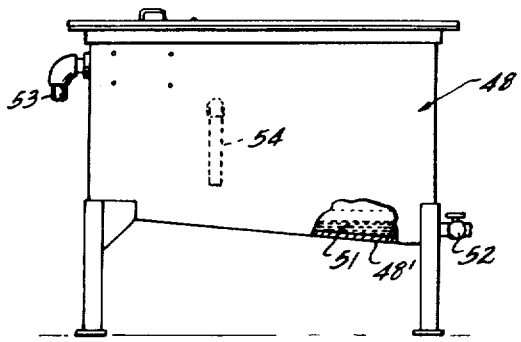

PUMP AND VALVE UNIT FOR ELECTRICAL DISCHARGE MACHINING

This is a division of my copending application Ser. No. 118,316, filed Feb. 24, 1971.

This invention relates to electrical discharge machining equipment. More particularly, this invention relates to machinery for handling fluid used in electrical discharge machining.

Electrical discharge machining is carried out by applying a high frequency voltage across an electrode and a closely spaced workpiece with an essentially non-conducting machining fluid in the gap therebetween. The machining fluid is caused to flow continuously through the gap between the electrode and the workpiece to entrain particles of metal detached from the workpiece and from the electrode and to remove these particles. The machining fluid is filtered and recirculated. During the machining operation, a steady flow of filtered fluid through the gap is required. The machining is carried on with the workpiece mounted in a reservoir filled sufficiently with the machining fluid that the interacting parts of the electrode and the workpiece are submerged. Periodically, the supply of fluid in the reservoir must be removed to remove particles separated from the workpiece and from the electrode during machining, and then the supply of fluid in the reservoir must be replenished before further machining is performed.

An object of this invention is to provide a fluid filtering and storage system which supplies a steady flow of filtered fluid to the gap between electrode and workpiece during machining operations and in which there is provision for removing a main supply of fluid from the reservoir and for storing same.

A further object of this invention is to provide a vacuum filter for such a system in which a pump of the vacuum filter serves to supply filtered fluid under pressure to the electrode during machining and also serves to provide pumping power for pumping the main supply of fluid between the reservoir and a storage tank.

A further object of this invention is to provide such a system in which only filtered fluid passes through the pump.

Briefly, this invention provides an electrical discharge machining system in which machining fluid passes through a vacuum filter. A vacuum pump draws filtered fluid from the filter and directs the filtered fluid to a clean fluid pressure storage tank. Fluid under pressure from the clean fluid pressure storage tank is directed to the electrode and is also directed to a jet pump. A side arm of the jet pump can be connected to a reservoir loading and unloading line and also to a used fluid storage tank loading and unloading line. When the side arm of the jet pump is connected to the reservoir loading and unloading line, the jet discharge is connected to the storage tank loading and unloading line, and when the side arm of the jet pump is connected to the storage tank loading and unloading line, the jet discharge is connected to the reservoir loading and unloading line.

The above and other objects and features of the invention will be apparent to those skilled in the art to which this invention pertains from the following detailed description and the drawings, in which:

FIG. 2 is a top plan view of a pump and valving unit forming a part of the fluid handling and filtering system, pipe connections thereto being shown in dashed lines, alternate positions for a handle thereof being shown in dot-dash and double dot-dash lines;

FIG. 3 is an elevational view looking in the direction of the arrows 3—3 in FIG. 2;

FIG. 4 is an elevational view taken in the direction of the arrows 4—4 in FIG. 2;

FIG. 5 is a view in section taken on the line 5—5 in FIG. 4;

FIG. 6 is a view in section taken on the line 6—6 in FIG. 2;

FIG. 7 is a view in section taken on the line 7—7 in FIG. 4;

FIG. 8 is a view in section taken on the line 8—8 in FIG. 2;

FIG. 9 is a view in section taken on the line 9—9 in FIG. 2; and

FIG. 10 is a view in side elevation, partly broken away and in section of a fluid storage and settling tank which forms a part of the system shown in FIG. 1.

In the following detailed description and the drawings, like reference characters indicate like parts.

Figure 1:
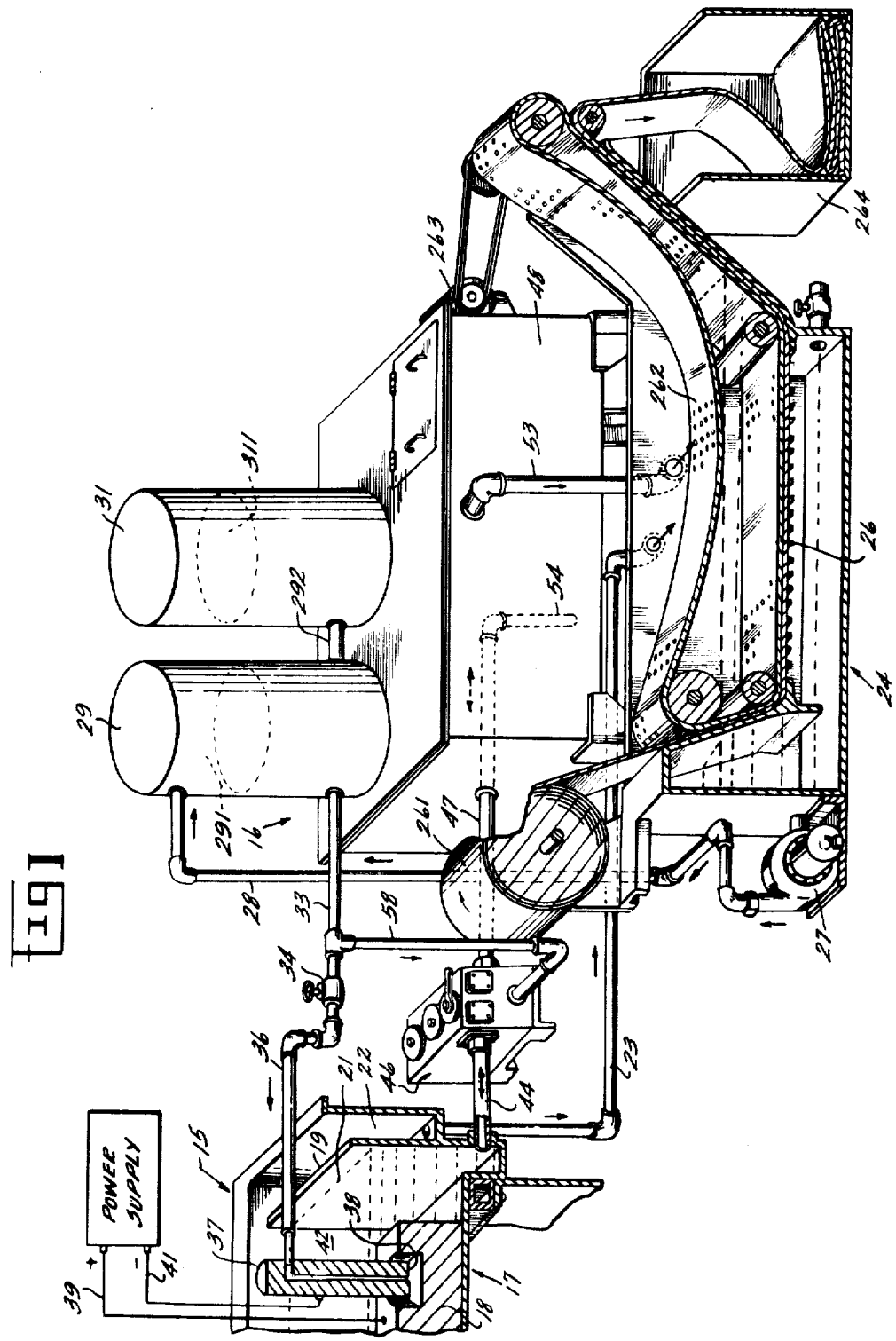
FIG. 1 is a somewhat schematic perspective view, partly broken away and in section showing an electrical discharge machining device associated with a fluid handling and filtering system constructed in accordance with an embodiment of this invention.

In FIG. 1 is illustrated electrical discharge machining apparatus 15 together with a fluid handling and filtering system 16 constructed in accordance with an embodiment of this invention.

The fluid handling and filtering system includes a worktable reservoir tank 17 in which a workpiece 18 is mounted. A weir 19 is mounted in the reservoir 17 over which machining fluid 21 can overflow into an end chamber 22 from which the overflowing fluid is drained through a line 23 which discharges into a vacuum filter 24 where the fluid passes through a filter material web 26. The filter 24 can be of the type shown in greater detail in my application Ser. No. 14,521 filed Feb. 26, 1970. The filter material web 26 is supplied from a roll 261 and passes through the filter with an openwork conveyor 262. The conveyor is advanced as needed by operation of a drive motor 263. Used filter material is collected in a hopper 264. From the filter 24, the filtered fluid is pumped by a pump 27 through a line 28 to clear fluid pressure storage tanks 29–31 where the clear fluid is stored under pressure. The storage tanks 29–31 are provided with air spaces 291–311 above the liquid, and compression of air in the air spaces serves to maintain pressure in the tanks 29–31. Lower end portions of the tanks 29–31 are connected by a line 292. When needed, liquid is discharged from the pressure storage tanks 29–31 through a pressure line 33. The line 33 is connected to a shut-off valve 34, and the shut-off valve 34 is connected to a line 36 which leads to an electrode 37. The electrode 37 is held in position by any suitable means, not shown, so that an appropriate gap may be maintained between the operative end 38 of the electrode 37 and the workpiece 18 during the machining operations. Electric power is supplied from an appropriate power source through power leads 39 and 41 connected to the workpiece 18 and the electrode 37, respectively.

During machining, a level of fluid 42 is maintained in the reservoir 17 which overlies the interacting portions of the workpiece 18 and of the electrode 37, and, preferably, the entire workpiece 18 is submerged. The fluid surrounding the workpiece and the operative portion of the electrode can be drained from the reservoir through a line 44 and a pump and valving unit 46 to a line 47 which discharges into a used fluid storage and settling tank 48. When the fluid is drained from the reservoir 17, particles of material removed from the workpiece 18 and from the electrode 37 during machining travel with the fluid to be permitted to settle to the bottom of the storage tank 48 as a sludge 51 as indicated in FIG. 10. The sludge 51 can be withdrawn from the storage tank 48 through a valve 52. A bottom plate 48' of the storage tank 48 slopes toward the valve 52 to direct the sludge thereto. An overflow line 53 directs excess fluid from the storage and settling tank 48 to the filter 24, as shown in FIG. 1.

Supernatant fluid in the storage tank 48, although unfiltered and insufficiently clean to be directed to the gap between the electrode and the workpiece, is sufficiently clean for use in filling the reservoir 17 surrounding the workpiece 18, and, when a new machining operation is to be undertaken, the supernatant fluid is withdrawn from the storage and settling tank 48 through a dip tube portion 54 of the line 47 to the pump and valving unit 46. The unit 46 pumps this fluid back through the line 44 to the reservoir 17.

Details of construction of the pump and valving unit 46 are shown in FIGS. 2-9 inclusive. The unit 46 includes a body block 56. Fluid under pressure from the pressure line 33 is directed to the unit 46 through a line 58 to a jet fitting 59 which is mounted in a threaded opening 61 (FIGS. 7 and 9) in a wall 62 of the block 56. The line 44 is connected to an inlet-outlet fitting 63 (FIG. 2). The line 47 is connected to an inlet-outlet fitting 64.

The jet fitting 59 is directed into a generally venturi-shaped bore 65 (FIGS. 7 and 9) in the block 56. An upright side arm bore 66 (FIG. 9) communicated with a jet chamber 66' in the block 56 surrounding the jet fitting 59 and with the venturi-shaped bore 65. The jet fitting 59, the venturi-shaped bore 65 and the side arm bore 66 form a jet pump or ejector. The outlet end of the venturi-shaped bore 65 communicated with an upright bore 67. Flow through the unit 46 is controlled by ball diverter valve members 68 and 69 (FIG. 5) mounted in the upright bores 66 and 67 respectively. The ball valve members are similar in construction, and only the ball valve member 68 will be described in detail. As shown in FIG. 6, the ball valve member 68 includes an upright blind bore 71 and a transverse blind bore 72 which meet at a hollow interior of the ball valve member 68. The ball is mounted between resilient sealing ring members 73 and 74, which are mounted in a transverse bore 75 in the block 56 which intersects the side arm bore 66. The ring member 73 is held against a shoulder 76 in the bore 75 by the ball 68. A tube member 77 holds the ring member 74 in engagement with the ball 68. The tube member 77 is integral with and communicates with the interior of the inlet-outlet fitting 64. Appropriate screw fasteners 79 (FIGS. 2 and 4) hold the tube member 77 in position inside a counterbore portion 75' of the bore 75 (FIG. 6). An opening 80 (FIG. 5) in the tube member 77 provides communication with a lengthwise bore 80' in the block 56. A sealing ring 81 forms a seal between the block 56 and the inlet-outlet fitting 64. A transverse bore portion 82 provides communication between the inlet fitting 63 and the ring member 73. The inlet-outlet fitting 63 is held in position on the block 56 overlying the bore portion 82 by fasteners 821. A sealing ring 822 forms a seal between the inlet fitting-outlet 63 and the block 56. The ball member 68 carries a stem 84 on which a handle 86 is mounted. The stem extends upwardly through a bore 861 in the block 56. A sealing ring 862 forms a seal between the stem 84 and the block 56. The handle 86 and the ball valve member can be turned from the position at which the handle is shown in full lines in FIG. 2 and there is communication between the inlet-outlet fitting 63 and the side arm bore 66, an intermediate position shown in double dot-dash lines at which the upright bores 66 and 67 are closed by the ball valve members 68 and 69, respectively and an alternate operative position at which the handle is shown in dot-dash lines and the inlet-outlet fitting 64 is in communication with the side arm bore 66.

The ball valve member 69 is mounted at the upper end of the upright bore 67 and centrally of a transverse bore 88 (FIG. 5). One end portion of the bore 88 communicates with the inlet-outlet fitting 63 by means of a lengthwise bore 89. The other end portion of the bore 88 is counterbored at 88' and communicates with the inlet-outlet fitting 64 by means of the lengthwise bore 80'. The ball valve member 69 is mounted between resilient ring members 91 and 92. The ring member 92 is held in engagement with the ball valve member 69 by a cup member 95. An opening 96 in a wall 97 of the cup member 95 provides communication between the lengthwise bore 80' and the ball valve member 69. Screw fasteners 99 hold the cup member 95 in position in the counterbore 881. A sealing ring 101 provides a seal between the cup member 95 and the block 56.

As shown in FIG. 9, a spur gear 102 is mounted on the stem 84 of the ball valve member 68. A spur gear 103 is mounted on a stem 104 of the ball valve member 69. The gears 102 and 103 are keyed to the stems 84 and 104, respectively, by appropriate keys, not shown. An idler gear 106 is mounted on a stub shaft 107 and meshes with the spur gears 102 and 103 so that the spur gears 102 and 103 and the ball valve members 68 and 69 turn together.

When the ball valve members are in the position shown in FIGS. 2-9 inclusive, the side arm bore 66 (FIG. 6) is in communication with the inlet-outlet fitting 63, and fluid is drawn in through the line 44 (FIG. 2) to be removed from the reservoir 17 (FIG. 1) and fluid from the venturi-shaped bore 65 (FIG. 9) passes upwardly through the upright bore 67, through the ball valve member 69 to the interior of the cup member 95 (FIG. 8) and through the opening 96 (FIG. 5) in the wall of the cup member 95, along the lengthwise bore 80' and through the opening 80 in the tube member 77 to the inlet-outlet fitting 64 to be discharged through the inlet-outlet fitting 64 and the line 47 (FIG. 2) to the storage and settling tank 48 (FIG. 1). When the handle 86 (FIG. 2) is in the intermediate (double dot-dash line) position of FIG. 2, the ball valve members are in closed position, and there is no flow through the unit 56.

When the handle 86 is in the alternate operative (dot-dash line) position of FIG. 2, the ball valve member 68 is open to the inlet-outlet fitting 64 and the ball valve member 69 is open to the inlet-outlet fitting 63 (See FIG. 5). As fluid from the jet fitting 59 is injected into the venturi-shaped bore 65, fluid from the line 47 and the storage and settling tank 48 is drawn in through the inlet-outlet fitting 64 to pass through the ball valve member 68 and down the side arm bore 66 and to be carried through the upright bore 67, the ball valve member 69, the transverse bore portion 88 and the lengthwise bore 89 to the inlet-outlet fitting 63 through which the fluid is discharged through the line 44 to the worktable reservoir 17.

The fluid handling system for electrical discharge machining illustrated in the drawings and described above is subject to structural modification without departing from the spirit and scope of the appended claims.

Having described my invention, what I claim as new and desire to secure by letters patent is:

1. A pump and valve unit which comprises a block, there being a venturi-shaped bore in the block, a jet fitting directed into one end of the venturi-shaped bore, there being a first side arm bore in the block in communication with the jet fitting and with an inlet end of the venturi-shaped bore and a second side arm bore in the block in communication with a discharge end of the venturi-shaped bore, diverter valve members in the side arm bores, first and second inlet-outlet bores in the block, means for connecting each of the inlet-outlet bores with each of the diverter valve members, and means for linking the diverter valve members to move between a first position in which the first inlet-outlet bore is in communication with the first side arm bore and the second inlet-outlet bore is in communication with the second side arm bore and a second position in which the first inlet-outlet bore is in communication with the second side arm bore and the second inlet-outlet bore is in communication with the first side arm bore, whereby, when fluid under pressure is introduced into the jet fitting, fluid can be pumped alternately between the inlet-outlet bores.

2. A pump and valve unit as in claim 1 wherein the diverter valve members can be moved to a third position in which both of the diverter valve members are closed.

* * * * *